United States Patent
Ishii et al.

(10) Patent No.: US 11,192,826 B2
(45) Date of Patent: Dec. 7, 2021

(54) SINTERED MATERIAL AND METHOD OF PRODUCING SAME

(71) Applicant: Sumitomo Electric Industries, Ltd., Osaka (JP)

(72) Inventors: Akito Ishii, Osaka (JP); Katsumi Okamura, Osaka (JP)

(73) Assignee: Sumitomo Electric Industries, Ltd., Osaka (JP)

(*) Notice: Subject to any disclaimer, the term of this patent is extended or adjusted under 35 U.S.C. 154(b) by 25 days.

(21) Appl. No.: 16/609,369

(22) PCT Filed: Feb. 15, 2018

(86) PCT No.: PCT/JP2018/005206
§ 371 (c)(1),
(2) Date: Oct. 29, 2019

(87) PCT Pub. No.: WO2018/216270
PCT Pub. Date: Nov. 29, 2018

(65) Prior Publication Data
US 2020/0055780 A1 Feb. 20, 2020

(30) Foreign Application Priority Data

May 26, 2017 (JP) .............................. JP2017-104697

(51) Int. Cl.
| | |
|---|---|
| C04B 35/5831 | (2006.01) |
| B23B 27/20 | (2006.01) |
| C04B 35/628 | (2006.01) |
| C04B 35/63 | (2006.01) |
| C04B 35/645 | (2006.01) |

(52) U.S. Cl.
CPC .......... *C04B 35/5831* (2013.01); *B23B 27/20* (2013.01); *C04B 35/62823* (2013.01); *C04B 35/6303* (2013.01); *C04B 35/645* (2013.01); C04B 2235/3217 (2013.01); C04B 2235/3246 (2013.01); C04B 2235/386 (2013.01); C04B 2235/3843 (2013.01); C04B 2235/3886 (2013.01); C04B 2235/3895 (2013.01); C04B 2235/85 (2013.01)

(58) Field of Classification Search
CPC .......... C04B 35/5831; C04B 35/62823; C04B 35/645; C04B 2235/3217; C04B 2235/3246; C04B 2235/386; C04B 2235/85; C04B 2235/3244
See application file for complete search history.

(56) References Cited

U.S. PATENT DOCUMENTS

| | | | |
|---|---|---|---|
| 2016/0052827 A1* | 2/2016 | Matsuda | ............. C04B 35/5831 501/96.4 |
| 2017/0197885 A1 | 7/2017 | Okamura et al. | |
| 2017/0197886 A1 | 7/2017 | Danda et al. | |
| 2017/0233295 A1 | 8/2017 | Ishii et al. | |
| 2017/0233296 A1* | 8/2017 | Shiro | ...................... B23B 27/20 428/336 |

FOREIGN PATENT DOCUMENTS

| | | | |
|---|---|---|---|
| EP | 3156384 A1 | 4/2017 | |
| JP | WO-2016068222 A1 * | 5/2016 | ......... C04B 35/5831 |
| WO | 2007/110770 A2 | 10/2007 | |
| WO | 2016/068222 A1 | 5/2016 | |
| WO | 2016/194398 A1 | 8/2016 | |
| WO | 2016/171155 A1 | 10/2016 | |
| WO | 2016/194416 A1 | 12/2016 | |

OTHER PUBLICATIONS

Yamamoto et al., "Fabrication of High Strength and Toughness Ceramics Using Pulsed Electric-Current Pressure Sintering of ZrO2(Y2O3)-Al2O3 Solid Solution Powders Prepared by the Neutralization Co-precipitation Method," J. Jpn. Soc. Powder Metallurgy, vol. 60, No. 10, 2013, pp. 428-435. [Cited in NPL2, w/ Abstract].

Notification of the First Office Action issued in counterpart Chinese Patent Application No. 201880034398.7 dated Jul. 21, 2021.

* cited by examiner

*Primary Examiner* — Noah S Wiese
(74) *Attorney, Agent, or Firm* — Baker Botts L.L.P.; Michael A. Sartori

(57) ABSTRACT

A sintered material includes a first phase and a second phase, wherein the first phase is composed of cubic boron nitride particles, and the following relational expressions are satisfied when more than or equal to two cubic boron nitride particles adjacent to and in direct contact with each other among the cubic boron nitride particles are defined as a contact body, Di represents a length of an entire perimeter of the contact body, n represents the number of contact locations at which the cubic boron nitride particles are in direct contact with each other, $d_k$ represents a length of each of the contact locations, and $\Sigma d_k$ (where k=1 to n) represents a total length of the contact locations: $Dii = Di + (2 \times \Sigma d_k$ (where k=1 to n)); and $[(Dii - Di)/Dii] \times 100 \leq 50$.

8 Claims, No Drawings

SINTERED MATERIAL AND METHOD OF PRODUCING SAME

TECHNICAL FIELD

The present invention relates to a sintered material and a method of producing the sintered material. The present application claims a priority based on Japanese Patent Application No. 2017-104697 filed on May 26, 2017, the entire content of which is incorporated herein by reference.

BACKGROUND ART

WO 2016/171155 (Patent Literature 1) discloses a sintered material including: cubic boron nitride (hereinafter, also referred to as "cBN"); and partially stabilized zirconia (hereinafter, also referred to as "ATZ") in which $Al_2O_3$ is dispersed in both or one of a crystal grain boundary and a crystal grain. When applied to a cutting tool, this sintered material exhibits excellent characteristics in terms of breakage resistance in high-speed cutting.

CITATION LIST

Patent Literature

PTL 1: WO 2016/171155

SUMMARY OF INVENTION

A sintered material according to one embodiment of the present disclosure is a sintered material including a first phase and a second phase, wherein the first phase is composed of cubic boron nitride particles, the second phase is composed of a first material that is partially stabilized $ZrO_2$ in which $Al_2O_3$ is dispersed in both or one of a crystal grain boundary and a crystal grain, the second phase is in contact with at least a portion of a surface of the first phase, and the following relational expressions (I) and (II) are satisfied when more than or equal to two cubic boron nitride particles adjacent to and in direct contact with each other among the cubic boron nitride particles are defined as a contact body, Di represents a length of an entire perimeter of the contact body, n represents the number of contact locations at which the cubic boron nitride particles are in direct contact with each other, $d_k$ represents a length of each of the contact locations, and $\Sigma d_k$ represents a total length of the contact locations, where k=1 to n:

$$Dii = Di + \left(2 \times \sum_{k=1}^{n} d_k\right) \quad (I)$$

$$[(Dii - Di)/Dii] \times 100 \leq 50 \quad (II)$$

A method of producing a sintered material according to one embodiment of the present disclosure is a method of producing a sintered material including a first phase composed of cubic boron nitride particles and a second phase composed of a first material, the method including: a first step of obtaining a sintering precursor by coating the cubic boron nitride particles with the first material; and a second step of obtaining the sintered material by sintering the sintering precursor at a pressure of more than 1 GPa and less than or equal to 20 GPa, wherein the first material is partially stabilized $ZrO_2$ in which $Al_2O_3$ is dispersed in both or one of a crystal grain boundary and a crystal grain.

DETAILED DESCRIPTION

Problems to be Solved by the Present Disclosure

In a technical field relating to cutting tools, a difficult-to-cut material, such as a centrifugal cast iron, may be required to be cut under severer conditions in terms of cutting speed and the like. In that case, in the sintered material disclosed in Patent Literature 1, there is room for improvement in strength and life.

The present disclosure has been made in view of the above-described actual circumstances, and has an object to provide: a sintered material improved in strength and life and therefore allowing for cutting under a severer condition; and a method of producing the sintered material.

Advantageous Effect of the Present Disclosure

According to the description above, there can be provided: a sintered material improved in strength and life and therefore allowing for cutting under a severer condition; and a method of producing the sintered material.

DESCRIPTION OF EMBODIMENTS

The present inventors have studied a sintered material allowing for cutting under a severer condition, and have found that a sintered material produced by sintering cBN particles coated with ATZ is improved in strength and life because the cBN particles are suppressed from being in direct contact with each other in the sintered material. Accordingly, the present inventors have arrived at a sintered material and a method of producing the sintered material according to the present disclosure.

First, embodiments of the present invention are listed and described.

[1] A sintered material according to one embodiment of the present disclosure is a sintered material including a first phase and a second phase, wherein the first phase is composed of cubic boron nitride particles, the second phase is composed of a first material that is partially stabilized $ZrO_2$ in which $Al_2O_3$ is dispersed in both or one of a crystal grain boundary and a crystal grain, the second phase is in contact with at least a portion of a surface of the first phase, and the following relational expressions (I) and (II) are satisfied when more than or equal to two cubic boron nitride particles adjacent to and in direct contact with each other among the cubic boron nitride particles are defined as a contact body, Di represents a length of an entire perimeter of the contact body, n represents the number of contact locations at which the cubic boron nitride particles are in direct contact with each other, $d_k$ represents a length of each of the contact locations, and $\Sigma d_k$ represents a total length of the contact locations, where k=1 to n. With such a configuration, the sintered material can be improved in strength and life.

$$Dii = Di + \left(2 \times \sum_{k=1}^{n} d_k\right) \quad (I)$$

$$[(Dii - Di)/Dii] \times 100 \leq 50 \quad (II)$$

[2] More than or equal to 30 volume % and less than 50 volume % of the first phase is included in the sintered material, and the following relational expression (II') is preferably satisfied:

$$[(Dii-Di)D)/Dii]\times 100 \leq 3 \tag{II'}$$

Accordingly, when used as a cutting tool, the sintered material can be used suitably in a finishing step in cutting of a difficult-to-cut material.

[3] Preferably, more than or equal to 50 volume % and less than 76 volume % of the first phase is included in the sintered material, and the following relational expression (II'') is satisfied:

$$[(Dii-Di)/Dii]\times 100 \leq 20 \tag{II''}$$

Accordingly, when used as a cutting tool, the sintered material can be used suitably in a rough finishing step in cutting of a difficult-to-cut material.

[4] More than or equal to 76 volume % and less than 100 volume % of the first phase is preferably included in the sintered material. Accordingly, when used as a cutting tool, the sintered material can be used suitably for cutting of a particularly hard difficult-to-cut material.

[5] Preferably, the sintered material further includes a third phase, wherein the third phase is composed of at least one compound composed of at least one element selected from a group consisting of a group 4 element, a group 5 element, a group 6 element in a periodic table, Al and Si, and at least one element selected from a group consisting of carbon, nitrogen, and oxygen. Accordingly, a sintered material also having more excellent toughness can be provided.

[6] A method of producing a sintered material according to one embodiment of the present disclosure is a method of producing a sintered material including a first phase composed of cubic boron nitride particles and a second phase composed of a first material, the method including: a first step of obtaining a sintering precursor by coating the cubic boron nitride particles with the first material; and a second step of obtaining the sintered material by sintering the sintering precursor at a pressure of more than 1 GPa and less than or equal to 20 GPa, wherein the first material is partially stabilized $ZrO_2$ in which $Al_2O_3$ is dispersed in both or one of a crystal grain boundary and a crystal grain. With such a configuration, a sintered material can be produced to have improved strength and life.

[7] Preferably, the first step includes a first pre-step of obtaining a particulate mixture including the cubic boron nitride particles and a binder, in the first step, the sintering precursor is obtained by coating, with the first material, the mixture obtained in the first pre-step instead of the cubic boron nitride particles, the sintered material further includes a third phase composed of the binder, the binder is composed of at least one compound composed of at least one element selected from a group consisting of a group 4 element, a group 5 element, a group 6 element in a periodic table, Al and Si, and at least one element selected from a group consisting of carbon, nitrogen, and oxygen. Accordingly, a sintered material having not only more improved strength and life but also more improved toughness can be produced.

[8] Preferably, the second step includes a second pre-step of obtaining a mixture precursor by mixing the sintering precursor and a binder, and in the second step, the sintered material is obtained by sintering, at a pressure of more than 1 GPa and less than or equal to 20 GPa, the mixture precursor obtained in the second pre-step instead of the sintering precursor. Accordingly, a sintered material having more improved toughness can be produced.

Details of Embodiments of the Invention of the Present Application

The following describes an embodiment (hereinafter, referred to as "the present embodiment") of the present invention more in detail; however, the present embodiment is not limited thereto.

Here, in the present specification, the expression "A to B" represents a range of lower to upper limits (i.e., more than or equal to A and less than or equal to B). When no unit is indicated for A and a unit is indicated only for B, the unit of A is the same as the unit of B. Moreover, when a compound or the like is expressed by a chemical formula in the present specification and an atomic ratio is not particularly limited, it is assumed that all the conventionally known atomic ratios are included. The atomic ratio is not necessarily limited only to one in the stoichiometric range. For example, when "TiC" is described, an atomic ratio in the TiC is not limited to Ti:C=1:1, and include all the conventionally known atomic ratios. The same also applies to compounds other than the "TiC".

[Sintered Material]

A sintered material according to the present embodiment includes a first phase and a second phase. The first phase is composed of cubic boron nitride particles, and the second phase is composed of a first material that is partially stabilized $ZrO_2$ in which $Al_2O_3$ is dispersed in both or one of a crystal grain boundary and a crystal grain.

<<First Phase>>

The first phase is composed of cubic boron nitride particles. The cubic boron nitride particles preferably have an average particle size of 0.1 to 5 μm. When the average particle size of the cubic boron nitride particles is less than 0.1 μm, the cubic boron nitride particles tends to be insufficiently sintered because the cubic boron nitride particles are likely to be aggregated when mixing with another powder. When the average particle size of the cubic boron nitride particles is more than 5 μm, strength thereof tends to be decreased due to grain growth during sintering.

The particle sizes of the cubic boron nitride particles are preferably uniform in order to attain no stress concentration and attain high strength. Further, the particle sizes of the cubic boron nitride particles preferably exhibit a normal distribution. Also, the cubic boron nitride particles preferably exhibit a binomial particle size distribution.

Such cubic boron nitride particles are preferably contained in the sintered material at a ratio of more than or equal to 30 volume % and less than 100 volume %. When the ratio of the cubic boron nitride particles is less than 30 volume %, hardness may be decreased to result in decreased wear resistance. When the ratio of the cubic boron nitride particles is 100 volume %, no first material is included, with the result that characteristics based on the first material are not obtained.

Here, more than or equal to 30 volume % and less than 50 volume % of the first phase (cubic boron nitride particles) is preferably included in the sintered material. Also, the following relational expression (II'), which is included in a range of a below-described relational expression (II), is preferably also satisfied:

$$[(Dii-Di)/Dii]\times 100 \leq 3 \tag{II'}$$

In this case, when used as a cutting tool, the sintered material is suitable for a finishing step in cutting of a difficult-to-cut material.

Further, more than or equal to 50 volume % and less than 76 volume % of the first phase is preferably included in the sintered material. Particularly, the following relational expressions (II''), which is included in the range of the below-described relational expression (II), is preferably also satisfied:

$$[(Dii-Di)/Dii] \times 100 \leq 20 \qquad (II'')$$

In this case, when used as a cutting tool, the sintered material is suitable for a rough finishing step in cutting of a difficult-to-cut material.

More than or equal to 76 volume % and less than 100 volume % of the first phase is preferably included in the sintered material. In this case, when used as a cutting tool, the sintered material is suitable for cutting of a particularly hard difficult-to-cut material.

The average particle size and content (volume %) of the cubic boron nitride particles can be confirmed as follows. Specifically, the sintered material is subjected to CP (Cross Section Polisher) processing using an argon ion beam, thereby obtaining a smooth cross section. This cross section is observed at a high magnification of 10000× using a field emission-type scanning electron microscope (FE-SEM) (trademark: "JSM-7800F" provided by JEOL), thereby specifying the cubic boron nitride particles in the visual field. Further, the equivalent circle diameters and areas of all the cubic boron nitride particles in the visual field were calculated through a binarization process using image analysis software (trademark: "WinRooF ver. 6.5.3" provided by Mitani Corporation). The average value of the equivalent circle diameters is regarded as the average particle size, and the average value of the areas is regarded as the content. Here, in the present specification, each area determined from the cross section obtained by the CP processing represents the content based on volume % as a unit, while assuming that the area is continuous in a depth direction.

<<Second Phase>>

The second phase is composed of a first material that is partially stabilized $ZrO_2$ in which $Al_2O_3$ is dispersed in both or one of a crystal grain boundary and a crystal grain.

<First Material>

The first material is partially stabilized $ZrO_2$ in which $Al_2O_3$ is dispersed in both or one of a crystal grain boundary and a crystal grain as described above. Here, the term "partially stabilized $ZrO_2$" has the conventionally known meaning, and typically refers to $ZrO_2$ in which cubic and tetragonal crystals, each of which is a crystal structure, become stable or metastable at a room temperature by dissolving an oxide other than zirconia in a solid state to decrease oxygen vacancy in the structure. Examples of the oxide include calcium oxide and magnesium oxide as well as a rare earth oxide such as yttrium oxide. The partially stabilized $ZrO_2$ can include one or two or more such oxides. An amount of solid solution of the oxide(s) other than zirconia is preferably about 1 to 4 mol % with respect to $ZrO_2$.

In the first material (second phase), less than or equal to 90 volume % of the $Al_2O_3$ is preferably included with respect to the partially stabilized $ZrO_2$. More preferably, less than or equal to 50 volume % of $Al_2O_3$ is included with respect to the partially stabilized $ZrO_2$. Since the first material has such a configuration, characteristics, such as high hardness, high strength, and high toughness, can be obtained, thus allowing for high-speed cutting of a difficult-to-cut material. When more than 90 volume % of the $Al_2O_3$ is included with respect to the partially stabilized $ZrO_2$, toughness tends to be decreased. The lower limit of the volume ratio of the $Al_2O_3$ with respect to the partially stabilized $ZrO_2$ may be 5 volume %. When less than 5 volume % of the $Al_2O_3$ is included with respect to the partially stabilized $ZrO_2$, the above characteristics tend to be unobtainable.

Such $Al_2O_3$ exists in a dispersed manner in both or one of a crystal grain boundary or a crystal grain of the partially stabilized $ZrO_2$. That is, the expression "exist in a dispersed manner" means that fine $Al_2O_3$ particles exist somewhere in the crystal grain boundary or the crystal grain. In other words, this means that the location of existence of the $Al_2O_3$ is not limited to a specific portion of the partially stabilized $ZrO_2$.

The $Al_2O_3$ is preferably a particle (crystal grain) of less than or equal to 1 µm, is more preferably a particle of less than or equal to 0.5 µm, and is further preferably a particle of less than or equal to 0.1 µm. The toughness tends to be more improved as the particle size becomes smaller, and thus, the lower limit of the particle size is not particularly limited. However, when the particle size becomes too small, the toughness of the substance itself tends to be decreased. Therefore, the particle size is preferably less than or equal to 0.005 µm. The $Al_2O_3$ exists in the dispersed manner in the first material and thus the toughness is dramatically improved. This is considered to result from toughening of the structure by the $Al_2O_3$.

The particle size and content (volume %) of the $Al_2O_3$ can be determined by the same method as the above-described method of specifying those of the cubic boron nitride particles. That is, a smooth cross section obtained by performing CP processing onto the sintered material using an argon ion beam is observed at a magnification of 10000× using the above-described FE-SEM, the equivalent circle diameters of the $Al_2O_3$ is calculated by the binarization process using the above-described image analysis software, and the average particle size can be obtained from the equivalent circle diameters. Further, each of the areas of the $Al_2O_3$ calculated by the binarization process using the image analysis software can be employed as the content thereof (volume %).

Also in the case of the first material, the above-described cross section is observed at a high magnification of 10000× using the FE-SEM, the equivalent circle diameters and areas of the first material are calculated by the binarization process using the above-described image analysis software, the average particle size can be obtained from the equivalent circle diameters, and each of the areas can be employed as the content thereof (volume %).

The first material is preferably contained in the sintered material at a ratio of 10 to 80 volume %. When the ratio is less than 10 volume %, the wear resistance and the breakage resistance may be decreased. When the ratio is more than 80 volume %, the hardness may be decreased and thus the wear resistance may be decreased. The ratio of the first material is more preferably 20 to 60 volume %.

As described above, the first material is partially stabilized $ZrO_2$ in which $Al_2O_3$ is dispersed in both or one of a crystal grain boundary and a crystal grain, and forms the second phase in the sintered material. However, since the ATZ normally acts also as a binder as described below, the first material may also act as a binder. Also in this case, irrespective of the action of the first material, the first material is preferably contained at a ratio of 10 to 80 volume % in the sintered material.

<Method of Producing First Material>

The first material can be obtained using a below-described neutralization co-precipitation method or sol-gel method, for example.

(Neutralization Co-Precipitation Method)

The neutralization co-precipitation method is a method including the following steps A and B. Such a method is described in a paper (J. Jpn. Soc. Powder Powder Metallurgy, Vol. 60, No. 10, P 428-435) published in 2013, for example.

(Step A)

A zirconium salt, a yttrium salt and an aluminum salt are used and mixed such that a molar ratio between zirconia ($ZrO_2$) and yttria ($Y_2O_3$) is 95:5 to 99.5:0.5 and a molar ratio between yttria-added zirconia and alumina ($Al_2O_3$) is 10:90 to 95:5, to thereby prepare a mixed solution. In the description above, yttria ($Y_2O_3$) is illustrated as the oxide dissolved in a solid state in zirconia ($ZrO_2$); however, the oxide is not limited only to this.

(Step B)

The mixed solution obtained in step A is neutralized by adding alkali thereto so as to co-precipitate zirconium, yttrium, and aluminum, thereby obtaining the first material as a precipitate. The precipitate is dried, is then heated at 650 to 750° C. for 7 to 12 hours, is then calcinated at 850 to 950° C. for 0.5 to 3 hours, and is pulverized using a ball mill or the like. Accordingly, the first material powder composed of $Y_2O_3$-stabilized $ZrO_2$—$Al_2O_3$ solid solution powder can be produced.

Here, examples of the zirconium salt in step A include: zirconium oxychloride ($ZrOCl_2$), zirconium oxynitrate ($ZrO(NO_3)_2$), and the like. Examples of the yttrium salt include yttrium chloride ($YCl_3$), yttrium nitrate ($Y(NO_3)_3$), and the like. Examples of the aluminum salt include aluminum chloride ($AlCl_3$) and the like. Moreover, examples of a solvent for the mixed solution include nitric acid, hydrochloric acid, and the like.

(Sol-Gel Method)

The sol-gel method is a method including the following step X. Such a method is, for example, described in a paper (J. Jpn. Soc. Powder Powder Metallurgy, Vol. 58, No. 12, P 727-732) published in 2011.

(Step X)

By using the sol-gel method, the first material is prepared as solid solution powder obtained by adding 20 to 30 mol % of $Al_2O_3$ to 70 to 80 mol % of $ZrO_2$ in which 0.3 to 3.5 mol % of $Y_2O_3$ is added to $ZrO_2$. Next, this solid solution powder is calcined at a temperature of more than or equal to a crystallization temperature, and is pulverized using a ball mill or the like, thereby preparing the first material powder composed of crystalline $ZrO_2$ solid solution powder.

(Other Methods)

The first material can also be obtained by a method other than the above-described two methods. That is, partially stabilized $ZrO_2$ and $Al_2O_3$ are mixed with each other in a solvent such as ethanol using a pulverizer such as a bead mill or a ball mill, thereby obtaining a slurry. Then, granulation is performed using this slurry, and the first material can thus be obtained as a granulated material. Granulation means is not particularly limited. Examples thereof include melt granulation, spray granulation, and the like.

This granulated material is improved in strength by the following method. Further, by pulverizing it using the ball mill or the like, the first material powder can be prepared.

(1) Performing sintering in a heat treatment furnace (for example, at 1000° C. in vacuum for 3 hours); or (2) Adding 10 mass % of a binder (a general binder such as PVB (polyvinyl butyral)) to the slurry, which is in a stage prior to the granulated material.

<<Relation Between First Phase and Second Phase>>

The second phase is in contact with at least a portion of a surface of the first phase. Accordingly, the cubic boron nitride particles tend to be suppressed from being in direct contact with each other, whereby the strength and life of the sintered material can be improved. This is presumably due to the following reason. That is, since cBN intrinsically has low sinterability, when the cBN particles are in contact with each other, clearances are likely to be generated between the cBN particles and at a triple point of the cBN particles. On the other hand, each of ATZ, $Al_2O_3$, and the like has excellent sinterability, and clearances are less likely to remain in the structure of the sintered material. Therefore, it is considered that by bringing the second phase into contact with at least a portion of the surface of the first phase to avoid clearances from remaining in the structure of the sintered material, the denseness of the sintered material is improved, with the result that the strength and life of the sintered material can be improved. The second phase may be in contact with a portion or whole of the surface of the first phase as long as the effect of the present disclosure is exhibited. Further, a ratio of the contact should not be limited as long as the effect of the present disclosure is exhibited.

In the sintered material according to the present embodiment, the following relational expressions (I) and (II) are satisfied when more than or equal to two cubic boron nitride particles adjacent to and in direct contact with each other are defined as a contact body, Di represents a length of an entire perimeter of the contact body, n represents the number of contact locations at which the cubic boron nitride particles are in direct contact with each other, $d_k$ represents a length of each of the contact locations, and $\Sigma d_k$ represents a total length of the contact locations, where k=1 to n:

$$Dii = Di + \left(2 \times \sum_{k=1}^{n} d_k\right) \quad (I)$$

$$[(Dii - Di)/Dii] \times 100 \leq 50 \quad (II)$$

Here, $\Sigma d_k$ (where k=1 to n) means $d_1+d_2+d_3+ \ldots +d_n$. n is a natural number.

When the cubic boron nitride particles are suppressed from being in direct contact with each other, the above-described formulas (I) and (II) are satisfied. Hence, the sintered material satisfying the above-described formulas (I) and (II) has improved strength and life. In the description below, [(Dii−Di)/Dii]×100 in the above-described formula (II) will be also referred to as "cBN contact ratio (%)".

Here, when more than or equal to 30 volume % and less than 50 volume % of the cubic boron nitride particles are included in the sintered material, the cBN contact ratio (%) is preferably less than or equal to 3, is more preferably less than or equal to 1, and is most preferably less than or equal to 0.5. When more than or equal to 50 volume % and less than 76 volume % of the cubic boron nitride particles are included in the sintered material, the cBN contact ratio (%) is preferably less than or equal to 20, is more preferably less than or equal to 15, and is most preferably less than or equal to 10. When more than or equal to 76 volume % and less than 100 volume % of the cubic boron nitride particles are included in the sintered material, the cBN contact ratio (%) is preferably less than or equal to 50, is more preferably less than or equal to 40, and is most preferably less than or equal to 30. The lower limit value of the cBN contact ratio (%) is 0 as an ideal value. When the cBN contact ratio (%) is more than 50, the effect of improving the strength in the sintered material tends to be insufficient.

The cBN contact ratio (%) is calculated in the following manner. That is, first, the cross section obtained by performing the CP processing to the sintered material is observed at a magnification of 10000× using the above-described FE-SEM to obtain an observation image. The observation image is subjected to the binarization process using the above-described image analysis software, thereby specifying the cBN particles. Next, more than or equal to two cBN particles adjacent to and in direct contact with each other among the specified cBN particles are defined as a contact body, and an outline of this contact body is drawn. Then, by tracing this outline, the length of the entire perimeter of the contact body is determined as Di. Further, the contact locations at which the cBN particles of the contact body are in direct contact with each other are manually drawn as lines. The number of the contact locations is represented by n and the length of each of the contact locations is represented by $d_k$ so as to determine $\Sigma d_k$ (where k=1 to n) as the total length of the contact locations. A value obtained by multiplying this total length $\Sigma d_k$ (where k=1 to n) by 2 is determined, and is then added to Di, thereby determining Dii (Dii=Di+($2 \times \Sigma d_k$ (where k=1 to n)).

From the above, the cBN contact ratio (%) can be calculated by substituting the values determined as Di and Dii for the following formula: [(Dii-Di)/Dii]×100. The cBN contact ratio (%) can be the average value of values obtained by determining Di and Dii for each of all the cBN particles in the state of the contact bodies among all the cBN particles in the above-described observation image and by substituting them for the above-described formula.

<Contact Ratio of First Phase and Second Phase>

As described above, the second phase is in contact with at least a portion of a surface of the first phase. The contact ratio (%) of the first phase and the second phase can be calculated by the following method. That is, the cross section obtained by performing the CP processing to the sintered material is observed at a magnification of 10000× using the above-described FE-SEM to obtain an observation image. The observation image is subjected to the binarization process using the above-described image analysis software, thereby specifying the cBN particles (first phase) and the first material (second phase) that coats the cBN particles (an outline mode of the image-analysis software is used). First, among the specified cBN particles, when a cBN particle exists in the form of a sole body (state in which the cBN particle is not in contact with another cBN particle), the perimeter of the cBN particle is drawn. When more than or equal to two cBN particles are in contact with each other to form an collected body (no component other than the cBN particles is included), the outline of this collected body is drawn. Next, the total of the lengths of the outlines and the perimeters of the sole bodies is determined as total length $L_B$ of the cBN particles. Further, the total of the lengths of portions of the first material (second phase) in direct contact with the sole bodies and the collected bodies in the outlines and the perimeters of the sole bodies is determined as total length $L_A$ of the first material (second phase).

As described above, the contact ratio (%) of the first phase and the second phase can be calculated by substituting the values determined as $L_A$ and $L_B$ for the formula ($L_A/L_B$)×100. The contact ratio (%) of the first phase and the second phase can be obtained by determining $L_A$ and $L_B$ for each of all the cBN particles and the first material that coats the cBN particles in the above-described observation image, and by substituting them for the above-described formula. On this occasion, the contact ratio (%) of the first phase and the second phase is preferably more than or equal to 80%, is more preferably more than or equal to 90%, and is most preferably more than or equal to 95%. The upper limit of the contact ratio (%) of the first phase and the second phase is 100%. Here, it is assumed that the contact portions thereof in contact with the first phase is included in total length $L_A$ of the first material even when the first material included in the sintered material acts as a binder.

<<Third Phase>>

The sintered material preferably further includes a third phase. Specifically, this third phase is preferably composed of at least one compound composed of at least one element selected from a group consisting of a group 4 element, a group 5 element, a group 6 element in a periodic table, Al and Si, and at least one element selected from a group consisting of carbon, nitrogen, and oxygen. Such a third phase acts as a binder. Accordingly, a sintered material also having more excellent toughness can be provided.

For example, the binder is composed of compound(s) such as $Al_2O_3$, MgO, SeO, $Y_2O_3$, HfO, TiC, TiN, $TiB_2$, TiCrN, ZrC, ZrN, $ZrB_2$, AlCrN, AlN, AlON, $AlB_2$, SiC, $Si_3N_4$, HfC, HfN, VC, VN, NbC, TaC, CrC, CrN, $Cr_2N$, MoC, and/or WC. The binder can be composed of one of the above-illustrated compounds solely or can be composed of two or more of the above-illustrated compounds in combination.

The binder preferably has an average particle size of 0.05 to 5 μm. If the average particle size of the binder is less than 0.05 μm, the binder is likely to be aggregated to result in a tendency of insufficient sintering when mixed with other powder. If the average particle size of the binder is more than 5 μm, the strength tends to be decreased due to grain growth during sintering.

In addition, the binder is preferably contained in the sintered material at a ratio of 5 to 50 volume % as the third phase. When the ratio of the binder is less than 5 volume %, the strength of the sintered material may not be sufficiently improved. On the other hand, when the ratio of the binder is more than 50 volume %, the ratio of the cBN particles may be decreased to result in decreased hardness of the sintered body. A more preferable ratio of the binder (third phase) is 10 to 30 volume %. Also, the average particle size of the binder can be determined by the same method as the method for the cBN particles.

The sintered material according to the present embodiment preferably has a strength of more than or equal to 1.5 GPa. This strength means bending strength σ. Bending strength a is indicated by a value of three-point bending strength measured by a three-point bending strength measuring instrument (trademark: "AG-Xplus" provided by Shimadzu Corporation) under conditions with a span length of 8 mm and a crosshead feed of 0.5 mm/min. The strength of the sintered material is more preferably more than or equal to 1.55 GPa. Although the upper limit of the strength of the sintered material should not be particularly limited, it is appropriate that the upper limit is less than or equal to 2.5 GPa based on the source material of the sintered material.

Each component composition and content ratio of the first phase (cBN), the second phase (first material), and the third phase (binder) in the sintered material can be determined by observing the above-described cross section at a high magnification of 10000× using the FE-SEM to obtain an observation image and performing an analysis thereon using a silicon drift detector (SDD; trademark: "Apollo XF" provided by EDAX Inc), which is one type of an energy dispersive X-ray spectrometer (EDX) in the FE-SEM.

[Method of Producing Sintered Material]

A method of producing the sintered material according to the present embodiment is a method of producing a sintered material including a first phase composed of cubic boron nitride particles and a second phase composed of a first material. The method of producing the sintered material includes: a first step of obtaining a sintering precursor by coating the cubic boron nitride particles with the first material; and a second step of obtaining the sintered material by sintering the sintering precursor at a pressure of more than 1 GPa and less than or equal to 20 GPa.

<<First Step>>

The first step is a step of obtaining a sintering precursor by coating the cubic boron nitride particles with the first material. The first material and the cubic boron nitride particles are as described above and are therefore not described.

<Specific Method of First Step>

In the first step of the present embodiment, the sintering precursor can be obtained by coating the cubic boron nitride particles (cBN particles) with the first material as described above. The sintering precursor can be obtained by the following method employing the sol-gel method, for example.

That is, first, Zr-i-$(OC_3H_7)_4$, $Al(OC_3H_7)_3$, $Y(OC_3H_7)_3$, and a predetermined amount of cBN particles prepared to attain a content of more than or equal to 30 volume % and less than 100 volume % in the sintered material are mixed in xylene for 2 hours, and $NH_4OH$ is then added thereto, thereby obtaining a first mixed solution. Next, the first mixed solution is subjected to reflux at 70 to 80° C. for 24 hours, thereby obtaining a first hydrolysis product. This first hydrolysis product is centrifuged, is then cleaned by hot water, and is then dried at 120° C. in vacuum, thereby obtaining a sintering precursor. By this sol-gel method, it is possible to prepare a sintering precursor in which the cBN particles are coated with the first material serving as solid solution powder (ATZ) in which 20 to 30 mol % of $Al_2O_3$ is dissolved in a solid state in 70 to 80 mol % of $ZrO_2$ including 0.3 to 3.5 mol % of $Y_2O_3$ with respect to $ZrO_2$.

<First Pre-Step>

The first step preferably includes a first pre-step of obtaining a particulate mixture including the cubic boron nitride particles and a binder. In this case, in the first step, the sintering precursor is obtained by coating, with the first material, the mixture obtained in the first pre-step instead of the cubic boron nitride particles. The binder is as described above and is therefore not described.

In the first pre-step, specifically, first, the first material powder is prepared by using a known method such as the neutralization co-precipitation method described above. This first material powder functions also as a binder. Next, the first material powder and the cubic boron nitride particles are added to a predetermined container and are mixed therein, thereby obtaining a particulate mixture. This particulate mixture (predetermined amount), Zr-i-$(OC_3H_7)_4$, $Al(OC_3H_7)_3$, and $Y(OC_3H_7)_3$ are mixed in xylene for 2 hours, and $NH_4OH$ is then added thereto, thereby obtaining a second mixed solution. Next, the second mixed solution is subjected to reflux at 70 to 80° C. for 24 hours, thereby obtaining a second hydrolysis product. This second hydrolysis product is centrifuged, is then cleaned by hot water, and is then dried at 120° C. in vacuum, thereby obtaining a sintering precursor. By this sol-gel method, it is possible to prepare a sintering precursor in which the cBN particles are coated with the first material serving as solid solution powder (ATZ) in which 20 to 30 mol % of $Al_2O_3$ is dissolved in a solid state in 70 to 80 mol % of $ZrO_2$ including 0.3 to 3.5 mol % of $Y_2O_3$ with respect to $ZrO_2$.

Then, the above-described sintering precursor is preferably shaped into a predetermined shape, dried, and calcined at 700 to 900° C. before performing the second step described later.

<<Second Step>>

The second step is a step of obtaining the sintered material by sintering the sintering precursor at a pressure of more than 1 GPa and less than or equal to 20 GPa. In the second step, it is more preferable to sinter the above-described sintering precursor at a pressure of more than or equal to 5 GPa and less than or equal to 20 GPa. Accordingly, a sintered material can be produced to have extremely improved strength and life.

Specific sintering conditions in this case are as follows. That is, the above-described sintering precursor is sintered by holding it at a temperature of 1000 to 1700° C. and a pressure of 5 to 20 GPa for 5 to 60 minutes. Although the sintering method is not particularly limited, hot press, ultra-high pressure press, or the like can be used.

Particularly, when the sintering is performed under a ultra-high pressure of 5 to 20 GPa, vacuum is more preferable as the gas atmosphere. On this occasion, a temperature increasing rate is set to 50 to 150° C./min.

More preferable sintering conditions in the second step are as follows: the temperature increasing rate is set to 50 to 150° C./min in vacuum; the pressure is 5 to 20 GPa; the sintering temperature is set to 1000 to 1700° C.; and the holding time is set to 5 to 60 minutes.

<Second Pre-Step>

The second step preferably includes a second pre-step of obtaining a mixture precursor by mixing the sintering precursor and the binder. In this case, in the second step, the sintered material is obtained by sintering, at a pressure of more than 1 GPa and less than or equal to 20 GPa, the mixture precursor obtained in the second pre-step instead of the sintering precursor. The sintering conditions for the mixture precursor may be the same as those for the sintering precursor described above.

Here, also when the method of producing the sintered material according to the present embodiment includes the second pre-step, it is more preferable to obtain the sintered material by sintering the mixture precursor at a pressure of more than or equal to 5 GPa and less than or equal to 20 GPa in the second step. Accordingly, a sintered material can be produced to have extremely improved strength and life.

The sintering conditions for the mixture precursor on this occasion may be the same as those for the sintering precursor described above. That is, sintering is performed by holding the mixture precursor for 5 to 60 minutes at a temperature of 1000 to 1700° C. under a ultra-high pressure of 5 to 20 GPa. Although the sintering method is not particularly limited, hot press, ultra-high pressure press, or the like can be used.

Particularly, when the sintering is performed under a ultra-high pressure of 5 to 20 GPa, vacuum is more preferable as the gas atmosphere. On this occasion, a temperature increasing rate is set to 50 to 150° C./min.

Preferable sintering conditions for the mixture precursor are as follows: the temperature increasing rate is set to 50 to 150° C./min in vacuum; the pressure is set to 5 to 20 GPa; the sintering temperature is set to 1000 to 1700° C.; and the holding time is set to 5 to 60 minutes.

The binder used in the second pre-step is the same as the one described as the binder used in the first pre-step.

In this way, with the method of producing the sintered material according to the present embodiment, a sintered material can be produced to have improved strength and life.

EXAMPLES

While the present invention will be described in more detail hereinafter with reference to Examples, the present invention is not limited thereto.

Example 1

<<Production of Sintered Material>>
<Sample 11>
(First Step)

As source materials, cBN particles and first material powder are prepared. First, an amount of cBN particles is prepared to attain a content of 40 volume % in the sintered material. Particularly, the cBN particles are prepared to be in a more uniform state by dispersing them using a ultrasonic dispersion device for 30 minutes. This is due to the following reason. That is, cBN particles having an average particle size of 3 µm are included at a ratio of 70 mass % with respect to the whole of the cBN particles, and cBN particles having an average particle size of 0.5 µm are included at a ratio of 30 mass % with respect to the whole of the cBN particles. Accordingly, the above-described cBN particles have a binomial particle size distribution. The first material powder is ATZ powder (provided by Daiichi Kigenso Kagaku Kogyo Co., LTD.) produced using the neutralization co-precipitation method described above. An amount of the first material powder is prepared to attain a content of 35 volume % in the sintered material. The above-described amount of the first material powder is prepared by performing calcination under conditions of 350° C. and 1 hour and under conditions of 850° C. and 1 hour and then performing pulverization in advance. The first material powder acts as a binder.

Next, by mixing the cBN particles and the first material powder, a particulate mixture is obtained (first pre-step). This particulate mixture (to attain a content of 75 volume % in the sintered material), Zr-i-$(OC_3H_7)_4$, $Al(OC_3H_7)_3$, and $Y(OC_3H_7)_3$ are mixed in xylene for 2 hours, and $NH_4OH$ is then added thereto, thereby obtaining a mixed solution. Next, reflux is performed for 24 hours under conditions with a nitrogen gas flow of 100 mL/min and a water temperature of 70° C., thereby obtaining a hydrolysis product. This hydrolysis product is centrifuged, is then cleaned by hot water, and is dried at 120° C. in vacuum, thereby obtaining a sintering precursor. Accordingly, the sintering precursor having the coated first material powder and the coated cBN particles are prepared using the first material serving as solid solution powder in which 25 mol % of $Al_2O_3$ is dissolved in a solid state in 75 mol % of $ZrO_2$ including 1.5 mol % of $Y_2O_3$ with respect to $ZrO_2$.

The first material serving as solid solution powder in which 25 mol % of $Al_2O_3$ is dissolved in a solid state in 75 mol % of $ZrO_2$ including 1.5 mol % of $Y_2O_3$ with respect to $ZrO_2$ serves as the second phase (first material) in the sintered material, and has a content of 25 volume % in the sintered material. Then, this sintering precursor is dried at 70° C., is then calcined at 350° C. for 1 hour, and is then calcined at 850° C. for 1 hour.

(Second Step)

Further, the sintering precursor is shaped by powder compacting at a pressure of 70 MPa to have a shape of a cutting tool described later, and is then shaped by a cold isostatic press (CIP) method at a pressure of 1000 MPa. Then, sintering is performed under a ultra-high pressure using the above-described ultra-high pressure pressing method. Specifically, the sintered material of sample 11 is obtained by performing sintering in vacuum at a temperature increasing rate of 150° C./min, a pressure of 7 GPa, and a sintering temperature of 1500° C. for a holding time of 60 minutes.

<Sample 12>
(First Step)

A sintering precursor is prepared in the same manner as in sample 11 except that as a source material, an amount of the same first material powder (ATZ powder) as that in sample 11 is prepared to attain a content of 40 volume % in the sintered material.

The first material powder acts as a binder.

(Second Step)

The sintered material of sample 12 is obtained by sintering the sintering precursor under the same sintering conditions as those for sample 11. In sample 12, the content of the second phase (first material) in the sintered material is 20 volume %.

<Sample 13>
(First Step)

A sintering precursor is prepared in the same manner as in sample 11 except that as a source material, an amount of the same first material powder (ATZ powder) as that in sample 11 is prepared to attain a content of 45 volume % in the sintered material.

The first material powder acts as a binder.

(Second Step)

The sintered material of sample 13 is obtained by sintering the sintering precursor under the same sintering conditions as those for sample 11. In sample 13, the content of the second phase (first material) in the sintered material is 15 volume %.

<Sample 14>
(First Step)

A sintering precursor is prepared in the same manner as in sample 11 except that as source materials, an amount of the same first material powder (ATZ powder) as that of sample 11 is prepared to attain a content of 25 volume % in the sintered material, and an amount of $Al_2O_3$ powder (trademark: "TM-DAR" provided by Taimei Chemicals Co., LTD.) is prepared to attain a content of 20 volume % in the sintered material. Each of the first material powder and the $Al_2O_3$ powder acts as a binder.

(Second Step)

The sintered material of sample 14 is obtained by sintering the sintering precursor under the same sintering conditions as those for sample 11. In sample 14, the content of the second phase (first material) in the sintered material is 15 volume %.

<Sample 15>
(First Step)

A sintering precursor is prepared in the same manner as in sample 11 except that as source materials, an amount of the same first material powder (ATZ powder) as that of sample 11 is prepared to attain a content of 25 volume % in the sintered material, and an amount of TiN powder (trademark: "TiN-01" provided by Japan New Metals) is prepared to attain a content of 20 volume % in the sintered material. Each of the first material powder and the TiN powder acts as a binder.

(Second Step)

The sintered material of sample 15 is obtained by sintering the sintering precursor under the same sintering conditions as those for sample 11. In sample 15, the content of the second phase (first material) in the sintered material is 15 volume %.

<Sample 16>

(First Step)

A sintering precursor is prepared in the same manner as in sample 11 except that as source materials, an amount of the same first material powder (ATZ powder) as that of sample 11 is prepared to attain a content of 25 volume % in the sintered material, and an amount of TiC powder (trademark: "TiC-01" provided by Japan New Metals Co., LTD.) is prepared to attain a content of 20 volume % in the sintered material. Each of the first material powder and the TiC powder acts as a binder.

(Second Step)

The sintered material of sample 16 is obtained by sintering the sintering precursor under the same sintering conditions as those for sample 11. In sample 16, the content of the second phase (first material) in the sintered material is 15 volume %.

<Sample 17>

(First Step)

A sintering precursor is prepared in the same manner as in sample 11 except that as source materials, an amount of the same first material powder (ATZ powder) as that of sample 11 is prepared to attain a content of 25 volume % in the sintered material, and an amount of AlON powder is prepared to attain a content of 20 volume % in the sintered material. The AlON powder is produced by the following method. In the production of the AlON powder, first, $Al_2O_3$ powder (trademark: "TM-DAR" provided by Taimei Chemicals) and hAlN (provided by Tokuyama Corporation; E grade) are mixed at a volume ratio of 3:2 using a ball mill, thereby obtaining a mixture. Next, this mixture is held under a nitrogen atmosphere at 30 kPa and 400° C. for 1 hour, and is then held at a temperature of 1850° C. for 3 hours, thereby performing heat treatment. Each of the temperature increasing rates in these cases is set to 10° C./min. After the heat treatment, the mixture is pulverized and passes through a 150 μm sieve, thereby obtaining the AlON powder. Each of the first material powder and the AlON powder acts as a binder.

(Second Step)

The sintered material of sample 17 is obtained by sintering the sintering precursor under the same sintering conditions as those for sample 11. In sample 17, the content of the second phase (first material) in the sintered material is 15 volume %.

<Sample 18>

As a source material, an amount of the same cBN particles as those used in sample 11 is prepared to attain a content of 40 volume % in the sintered material. Further, an amount of the same first material powder as that used in sample 11 is prepared to attain a content of 60 volume % in the sintered material.

The cBN particles and the first material powder are mixed, then this mixture is dried at 70° C., is then calcined at 350° C. for 1 hour and is calcined at 850° C. for 1 hour. Further, shaping is performed by powder compacting at a pressure of 70 MPa to form a shape of a cutting tool described later, and then shaping is performed by a cold isostatic press (CIP) method at a pressure of 1000 MPa. A sintered material of sample 18 is obtained by performing sintering under the same sintering conditions as those in the second step for sample 11. Therefore, the sintered material of sample 18 has not been through the step of coating the cBN particles with the first material, with the result that it is difficult to satisfy $[(Dii-Di)/Dii] \times 100 \leq 3$.

<<Evaluations on Sample 11 to Sample 18>>

<Content of Each Component>

Each of the sintered materials of sample 11 to sample 18 is subjected to the CP processing as described above, and a resulting cross section is observed using the above-described FE-SEM, thereby specifying respective regions of the cBN (first phase), the first material (second phase), and the binder (third phase) in the sintered material. Moreover, by the binarization process using the above-described image analysis software, the respective contents of the cBN (first phase), the first material (second phase), and the binder (third phase) are calculated. As a result, it can be confirmed that the respective contents of the cBN (first phase), the first material (second phase), and the binder (third phase) in each of the sintered materials of sample 11 to sample 18 are as shown in Table 1 and coincide with those of the respective source materials. In Table 1, the "content of the first material (second phase)" is shown as "Coating ATZ Amount". It should be noted that when each of the first material (second phase) and the binder (third phase) is ATZ, the numerical values of ATZ in the "Coating ATZ Amount" and "Binder Amount" in the Table are estimated values assuming that the respective contents coincide with those of the corresponding source materials.

<cBN Contact Ratio>

The cBN contact ratio in each of the sintered materials of sample 11 to sample 18 is calculated using the above-described method. That is, the CP-processed cross section of each of the sintered materials of sample 11 to sample 18 is observed using the above-described electron microscope to obtain a microscope image, and the cBN particles are specified therefrom by the binarization process using the above-described image analysis software, thereby determining distances Di and Dii. By substituting the values of Di and Dii for the formula $[(Dii-Di)/Dii] \times 100$, the cBN contact ratio is calculated. Results thereof are also shown in Table 1.

<Contact Ratio of First Phase and Second Phase>

For each of the sintered materials of sample 11 to sample 18, the contact ratio of the first phase and the second phase is calculated using the above-described method. That is, the CP-processed cross section of each of the sintered materials of sample 11 to sample 18 is observed using the above-described electron microscope to obtain a microscope image, and the cBN particles and the first material are specified therefrom by the binarization process using the above-described image analysis software, thereby determining total lengths $L_A$ and $L_B$. By substituting the values of $L_A$ and $L_B$ for the formula $(L_A/L_B) \times 100$, the contact ratio (%) of the first phase and the second phase is calculated. Results thereof are also shown in Table 1.

<Strength (Bending Strength a)>

The strength in each of the sintered materials of sample 11 to sample 18 is measured using the above-described method. That is, the three-point bending strength value (based on GPa as a unit) of each of the sintered materials of sample 11 to sample 18 is determined by the three-point bending strength measurement instrument (trademark: "AG-Xplus" provided by Shimadzu Corporation) under conditions with a span length of 8 mm and a crosshead feed of 0.5 mm/min. Results thereof are also shown in Table 1.

<Cutting Test>

Further, by performing finish-processing to each of the sintered materials of sample 11 to sample 18, a cutting tool having a shape of CNGA120408, a negative land angle of 15° and a negative land width of 0.12 mm is produced, and a high-speed cutting test is conducted under the following cutting conditions.

(Cutting Conditions)

Cutting speed: 1000 m/min

Feed: 0.28 mm

Depth of cut: 0.4 mm

Wet type/dry type: wet type (coolant: emulsion)

Device: $L_B 4000$ (provided by Okuma Corporation; a holder of EWN68-150CKB6 is used)

Workpiece: centrifugal cast iron (having a structure of dense perlite and having a chemical composition of gray cast iron)

Shape of workpiece: cylindrical shape (outer diameter f of 85 mm).

(Details of Test)

A cutting distance (km) for cutting by each of the cutting tools of sample 11 to sample 18 until occurrence of a breakage having a size of more than or equal to 200 μm is measured. It can be evaluated that as this cutting distance is longer, the cutting tool has a longer life. Results thereof are shown in Table 1.

conditions of 850° C. and 1 hour and then performing pulverization in advance. The first material powder acts as a binder.

By mixing the cBN particles and the first material powder, a particulate mixture is obtained (first pre-step). This particulate mixture (to attain a content of 85 volume % in the sintered material), $Zr-i-(OC_3H_7)_4$, $Al(OC_3H_7)_3$, and $Y(OC_3H_7)_3$ are mixed in xylene for 2 hours, and $NH_4OH$ is then added thereto, thereby obtaining a mixed solution. Next, reflux is performed for 24 hours under conditions with a nitrogen gas flow of 100 mL/min and a water temperature of 70° C., thereby obtaining a hydrolysis product. This hydrolysis product is centrifuged, is then cleaned by hot water, and is dried at 120° C. in vacuum, thereby obtaining a sintering precursor. Accordingly, the sintering precursor having the coated first material powder and the coated cBN particles are prepared using the first material serving as solid solution powder in which 25 mol % of $Al_2O_3$ is dissolved in a solid state in 75 mol % of $ZrO_2$ including 1.5 mol % of $Y_2O_3$ with respect to $ZrO_2$.

The first material serving as solid solution powder in which 25 mol % of $Al_2O_3$ is dissolved in a solid state in 75 mol % of $ZrO_2$ including 1.5 mol % of $Y_2O_3$ with respect to $ZrO_2$ serves as the second phase (first material) in the sintered material, and has a content of 15 volume % in the sintered material. Then, this sintering precursor is dried at

TABLE 1

| Sample Name | cBN Content (vol %) | Coating ATZ Amount (vol %) | Binder Amount (vol %) | | | | | cBN Contact Ratio (%) | Contact Ratio of First Phase and Second Phase (%) | Sintering Conditions | | Strength (GPa) | Life (km) |
|---|---|---|---|---|---|---|---|---|---|---|---|---|---|
| | | | ATZ | $Al_2O_3$ | TiN | TiC | AlON | | | Pressure (GPa) | Temperature (° C.) | | |
| Sample 11 | 40 | 25 | 35 | — | — | — | — | 0 | 100 | 7 | 1500 | 1.85 | 20 |
| Sample 12 | 40 | 20 | 40 | — | — | — | — | 0.5 | 99.5 | 7 | 1500 | 1.82 | 18 |
| Sample 13 | 40 | 15 | 45 | — | — | — | — | 1 | 99.0 | 7 | 1500 | 1.8 | 15 |
| Sample 14 | 40 | 15 | 25 | 20 | — | — | — | 1 | 95.8 | 7 | 1500 | 1.65 | 14 |
| Sample 15 | 40 | 15 | 25 | — | 20 | — | — | 1 | 95.8 | 7 | 1500 | 1.63 | 14 |
| Sample 16 | 40 | 15 | 25 | — | — | 20 | — | 1 | 95.8 | 7 | 1500 | 1.62 | 12 |
| Sample 17 | 40 | 15 | 25 | — | — | — | 20 | 1 | 95.8 | 7 | 1500 | 1.63 | 13 |
| Sample 18 | 40 | — | 60 | — | — | — | — | 4 | — | 7 | 1500 | 1.6 | 10 |

(Analysis)

As shown in Table 1, in each of the cutting tools employing sample 11 to sample 17 produced by the method of producing the sintered material according to the present disclosure, the second phase is in contact with at least a portion of the surface of the first phase, and the relational expressions, $[(Dii-Di)/Dii] \times 100 \leq 50$ and $[(Dii-Di)/Dii] \times 100 \leq 3$, are satisfied. Accordingly, it is understood that the strength and life are improved as compared with those of the cutting tool employing the sintered material of sample 18.

Example 2

<<Production of Sintered Material>>

<Sample 21>

(First Step)

As a source material, an amount of the same cBN particles as those in sample 11 of Example 1 is prepared to attain a content of 65 volume % in the sintered material. Further, an amount of the same first material powder as that in sample 11 of Example 1 is prepared to attain a content of 20 volume % in the sintered material. The above-described amount of the first material powder is prepared by performing calcination under conditions of 350° C. and 1 hour and under 70° C., is then calcined at 350° C. for 1 hour, and is then calcined at 850° C. for 1 hour.

(Second Step)

Further, the sintering precursor is shaped by powder compacting at a pressure of 70 MPa to have a shape of a cutting tool described later, and is then shaped by a cold isostatic press (CIP) method at a pressure of 1000 MPa. Then, sintering is performed under a ultra-high pressure using the above-described ultra-high pressure pressing method. Specifically, the sintered material of sample 21 is obtained by performing sintering in vacuum at a temperature increasing rate of 150° C./min, a pressure of 7 GPa, and a sintering temperature of 1500° C. for a holding time of 60 minutes.

<Sample 22>

(First Step)

A sintering precursor is prepared in the same manner as in sample 21 except that as source materials, an amount of the same first material powder (ATZ powder) as that of sample 21 is prepared to attain a content of 10 volume % in the sintered material, and an amount of $Al_2O_3$ powder (trademark: "TM-DAR" provided by Taimei Chemicals) is prepared to attain a content of 10 volume % in the sintered material. Each of the first material powder and the $Al_2O_3$ powder acts as a binder.

(Second Step)

The sintered material of sample 22 is obtained by sintering the sintering precursor under the same sintering conditions as those for sample 21. In sample 22, the content of the second phase (first material) in the sintered material is 15 volume %.

<Sample 23>
(First Step)

A sintering precursor is prepared in the same manner as in sample 21 except that as source materials, an amount of the same first material powder (ATZ powder) as that of sample 21 is prepared to attain a content of 10 volume % in the sintered material, and an amount of TiN powder (trademark: "TiN-01" provided by Japan New Metals) is prepared to attain a content of 10 volume % in the sintered material. Each of the first material powder and the TiN powder acts as a binder.

(Second Step)

The sintered material of sample 23 is obtained by sintering the sintering precursor under the same sintering conditions as those for sample 21. In sample 23, the content of the second phase (first material) in the sintered material is 15 volume %.

<Sample 24>
(First Step)

A sintering precursor is prepared in the same manner as in sample 21 except that as source materials, an amount of the same first material powder (ATZ powder) as that of sample 21 is prepared to attain a content of 10 volume % in the sintered material, and an amount of TiC powder (trademark: "TiC-01" provided by Japan New Metals) is prepared to attain a content of 10 volume % in the sintered material. Each of the first material powder and the TiC powder acts as a binder.

(Second Step)

The sintered material of sample 24 is obtained by sintering the sintering precursor under the same sintering conditions as those for sample 21. In sample 24, the content of the second phase (first material) in the sintered material is 15 volume %.

<Sample 25>
(First Step)

A sintering precursor is prepared in the same manner as in sample 21 except that as source materials, an amount of the same first material powder (ATZ powder) as that of sample 21 is prepared to attain a content of 10 volume % in the sintered material, and an amount of the same AlON powder as that used to produce sample 17 is prepared to attain a content of 10 volume % in the sintered material. Each of the first material powder and the AlON powder acts as a binder.

(Second Step)

The sintered material of sample 25 is obtained by sintering the sintering precursor under the same sintering conditions as those for sample 21. In sample 25, the content of the second phase (first material) in the sintered material is 15 volume %.

<Sample 26>
(First Step)

A sintering precursor is prepared in the same manner as in sample 21 except that as source materials, an amount of the same cBN particles as those in sample 21 is prepared to attain a content of 75 volume % in the sintered material, and an amount of the same first material powder as that in sample 21 is prepared to attain a content of 15 volume % in the sintered material. The first material powder acts as a binder.

(Second Step)

The sintered material of sample 26 is obtained by sintering the sintering precursor under the same sintering conditions as those for sample 21. In sample 26, the content of the second phase (first material) in the sintered material is 10 volume %.

<Sample 27>

As a source material, an amount of the same cBN particles as those used in sample 21 is prepared to attain a content of 75 volume % in the sintered material. Further, an amount of the same first material powder as that used in sample 21 is prepared to attain a content of 25 volume % in the sintered material.

The cBN particles and the first material powder are mixed, then this mixture is dried at 70° C., is then calcined at 350° C. for 1 hour and is calcined at 850° C. for 1 hour. Further, shaping is performed by powder compacting at a pressure of 70 MPa to form a shape of a cutting tool described later, and then shaping is performed by a cold isostatic press (CIP) method at a pressure of 1000 MPa. Then, the sintered material of sample 27 is obtained by performing sintering under the same sintering conditions as those in the second step for sample 21. Therefore, the sintered material of sample 27 has not been through the step of coating the cBN particles with the first material, with the result that it is difficult to satisfy $[(Dii-Di)/Dii] \times 100 \leq 20$.

<<Evaluations on Sample 21 to Sample 27>>
<Content of Each Component>

The respective contents of the cBN particles (first phase), the first material (second phase), and the binder (third phase) in each of the sintered materials of sample 21 to sample 27 are determined by the same method as in Example 1. Results thereof are as shown in Table 2, and it can be confirmed that these contents coincide with those of the source materials. In Table 2, the "content of the first material (second phase)" is shown as "Coating ATZ Amount". It should be noted that when each of the first material (second phase) and the binder (third phase) is ATZ, the numerical values of ATZ in the "Coating ATZ Amount" and "Binder Amount" in the Table are estimated values assuming that the respective contents coincide with those of the corresponding source materials.

<cBN Contact Ratio>

The cBN contact ratio in each of the sintered materials of sample 21 to sample 27 is calculated by the same method as that in Example 1. Results thereof are also shown in Table 2.

<Contact Ratio of First Phase and Second Phase>

The contact ratio of the first phase and the second phase in each of the sintered materials of sample 21 to sample 27 is calculated using the same method as in Example 1. Results thereof are also shown in Table 2.

<Strength (Bending Strength c)>

The three-point bending strength value (based on GPa as a unit) in each of the sintered materials of sample 21 to sample 27 is determined by the same method as that in Example 1. Results thereof are also shown in Table 2.

<Cutting Test>

Further, using each of the sintered materials of sample 21 to sample 27, a cutting tool having a shape of CNGA120408, a negative land angle of 15° and a negative land width of 0.12 mm is produced, and a high-speed cutting test is conducted under the following cutting conditions.

(Cutting Conditions)
Cutting speed: 1000 m/min
Feed: 0.3 mm
Depth of cut: 0.8 mm
Wet type/dry type: wet type (coolant: emulsion)

Device: LB4000 (provided by Okuma Corporation; a holder of EWN68-150CKB6 is used)

Workpiece: centrifugal cast iron (having a structure of dense perlite and having a chemical composition of gray cast iron)

Shape of workpiece: cylindrical shape (outer diameter ϕ of 85 mm).

(Details of Test)

A cutting distance (km) for cutting by each of the cutting tools of sample 21 to sample 27 until occurrence of a breakage having a size of more than or equal to 200 μm is measured. It can be evaluated that as this cutting distance is longer, the cutting tool has a longer life. Results thereof are shown in Table 2.

sintered material. Then, this sintering precursor is dried at 70° C., is then calcined at 350° C. for 1 hour, and is then calcined at 850° C. for 1 hour.

(Second Step)

Further, the sintering precursor is shaped by powder compacting at a pressure of 70 MPa to have a shape of a cutting tool described later, and is then shaped by a cold isostatic press (CIP) method at a pressure of 1000 MPa. Then, sintering is performed under a ultra-high pressure using the above-described ultra-high pressure pressing method. Specifically, the sintered material of sample 31 is obtained by performing sintering in vacuum at a temperature

TABLE 2

| Sample Name | cBN Content (vol %) | Coating ATZ Amount (vol %) | Binder Amount (vol %) | | | | | cBN Contact Ratio (%) | Contact Ratio of First Phase and Second Phase (%) | Sintering Conditions | | Strength (GPa) | Life (km) |
|---|---|---|---|---|---|---|---|---|---|---|---|---|---|
| | | | ATZ | $Al_2O_3$ | TiN | TiC | AlON | | | Pressure (GPa) | Temperature (° C.) | | |
| Sample 21 | 65 | 15 | 20 | — | — | — | — | 15 | 85 | 7 | 1500 | 1.7 | 20 |
| Sample 22 | 65 | 15 | 10 | 10 | — | — | — | 15 | 85 | 7 | 1500 | 1.65 | 25 |
| Sample 23 | 65 | 15 | 10 | — | 10 | — | — | 15 | 85 | 7 | 1500 | 1.62 | 19 |
| Sample 24 | 65 | 15 | 10 | — | — | 10 | — | 15 | 85 | 7 | 1500 | 1.61 | 18 |
| Sample 25 | 65 | 15 | 10 | — | — | — | 10 | 15 | 85 | 7 | 1500 | 1.6 | 17 |
| Sample 26 | 75 | 10 | 15 | — | — | — | — | 20 | 80 | 7 | 1500 | 1.55 | 15.2 |
| Sample 27 | 75 | — | 25 | — | — | — | — | 25 | — | 7 | 1500 | 1.5 | 15 |

(Analysis)

As shown in Table 2, in each of the cutting tools employing sample 21 to sample 26 produced by the method of producing the sintered material according to the present disclosure, the second phase is in contact with at least a portion of the surface of the first phase, and the relational expressions, [(Dii−Di)/Dii]×100≤50 and [(Dii-Di)/Dii]×100≤20, are satisfied. Accordingly, it is understood that the strength and life are improved as compared with those of the cutting tool employing the sintered material of sample 27.

Example 3

<<Production of Sintered Material>>
<Sample 31>
(First Step)

As a source material, an amount of the same cBN particles as those in sample 11 of Example 1 is prepared to attain a content of 85 volume % in the sintered material.

The cBN particles, $Zr\text{-}i\text{-}(OC_3H_7)_4$, $Al(OC_3H_7)_3$, and $Y(OC_3H_7)_3$ are mixed in xylene for 2 hours, and $NH_4OH$ is then added thereto, thereby obtaining a mixed solution. Next, reflux is performed for 24 hours under conditions with a nitrogen gas flow of 100 mL/min and a water temperature of 70° C., thereby obtaining a hydrolysis product. This hydrolysis product is centrifuged, is then cleaned by hot water, and is dried at 120° C. in vacuum, thereby obtaining a sintering precursor. Accordingly, the sintering precursor is prepared to have the coated cBN particles using the first material serving as solid solution powder in which 25 mol % of $Al_2O_3$ is dissolved in a solid state in 75 mol % of $ZrO_2$ including 1.5 mol % of $Y_2O_3$ with respect to $ZrO_2$.

The first material serving as solid solution powder in which 25 mol % of $Al_2O_3$ is dissolved in a solid state in 75 mol % of $ZrO_2$ including 1.5 mol % of $Y_2O_3$ with respect to $ZrO_2$ serves as the second phase (first material) in the sintered material, and has a content of 15 volume % in the increasing rate of 150° C./min, a pressure of 7 GPa, and a sintering temperature of 1500° C. for a holding time of 60 minutes.

<Sample 32>
(First Step)

As a source material, an amount of the same cBN particles as those in sample 11 of Example 1 is prepared to attain a content of 85 volume % in the sintered material. Further, an amount of the same first material powder as that in sample 11 of Example 1 is prepared to attain a content of 5 volume % in the sintered material. The above-described amount of the first material powder is prepared by performing calcination under conditions of 350° C. and 1 hour and under conditions of 850° C. and 1 hour and then performing pulverization in advance. The first material powder acts as a binder.

By mixing the cBN particles and the first material powder, a particulate mixture is obtained (first pre-step). This particulate mixture (to attain a content of 90 volume % in the sintered material), $Zr\text{-}i\text{-}(OC_3H_7)_4$, $Al(OC_3H_7)_3$, and $Y(OC_3H_7)_3$ are mixed in xylene for 2 hours, and $NH_4OH$ is then added thereto, thereby obtaining a mixed solution. Next, reflux is performed for 24 hours under conditions with a nitrogen gas flow of 100 mL/min and a water temperature of 70° C., thereby obtaining a hydrolysis product. This hydrolysis product is centrifuged, is then cleaned by hot water, and is dried at 120° C. in vacuum, thereby obtaining a sintering precursor. Accordingly, the sintering precursor having the coated first material powder and the coated cBN particles are prepared using the first material serving as solid solution powder in which 25 mol % of $Al_2O_3$ is dissolved in a solid state in 75 mol % of $ZrO_2$ including 1.5 mol % of $Y_2O_3$ with respect to $ZrO_2$.

The first material serving as solid solution powder in which 25 mol % of $Al_2O_3$ is dissolved in a solid state in 75 mol % of $ZrO_2$ including 1.5 mol % of $Y_2O_3$ with respect to $ZrO_2$ serves as the second phase (first material) in the sintered material, and has a content of 10 volume % in the sintered material. Then, this sintering precursor is dried at 70° C., is then calcined at 350° C. for 1 hour, and is then calcined at 850° C. for 1 hour.

(Second Step)

The sintered material of sample 32 is obtained by sintering the sintering precursor under the same sintering conditions as those for sample 31.

<Sample 33>

(First Step)

A sintering precursor is prepared in the same manner as in sample 32 except that as source materials, an amount of $Al_2O_3$ powder (trademark: "TM-DAR" provided by Taimei Chemicals) is prepared to attain a content of 5 volume % in the sintered material, instead of the first material powder (ATZ powder). This $Al_2O_3$ powder acts as a binder.

(Second Step)

The sintered material of sample 33 is obtained by sintering the sintering precursor under the same sintering conditions as those for sample 31. In sample 33, the content of the second phase (first material) in the sintered material is 10 volume %.

<Sample 34>

(First Step)

A sintering precursor is prepared in the same manner as in sample 32 except that as a source material, an amount of TiN powder (trademark: "TiN-01" provided by Japan New Metals) is prepared to attain a content of 5 volume % in the sintered material, instead of the first material powder (ATZ powder). The TiN powder acts as a binder.

(Second Step)

The sintered material of sample 34 is obtained by sintering the sintering precursor under the same sintering conditions as those for sample 31. In sample 34, the content of the second phase (first material) in the sintered material is 10 volume %.

<Sample 35>

(First Step)

A sintering precursor is prepared in the same manner as in sample 32 except that as a source material, an amount of TiC powder (trademark: "TiC-01" provided by Japan New Metals) is prepared to attain a content of 5 volume % in the sintered material, instead of the first material powder (ATZ powder). The TiC powder acts as a binder.

(Second Step)

The sintered material of sample 35 is obtained by sintering the sintering precursor under the same sintering conditions as those for sample 31. In sample 35, the content of the second phase (first material) in the sintered material is 10 volume %.

<Sample 36>

(First Step)

A sintering precursor is prepared in the same manner as in sample 32 except that as a source material, an amount of the same AlON powder as the one used to produce sample 17 is prepared to attain a content of 5 volume % in the sintered material, instead of the first material powder (ATZ powder). This AlON powder acts as a binder.

(Second Step)

The sintered material of sample 36 is obtained by sintering the sintering precursor under the same sintering conditions as those for sample 31. In sample 36, the content of the second phase (first material) in the sintered material is 10 volume %.

<Sample 37>

As a source material, an amount of the same cBN particles as those used in sample 32 is prepared to attain a content of 85 volume % in the sintered material. Further, an amount of the same first material powder as the one used in sample 32 is prepared to attain a content of 15 volume % in the sintered material.

The cBN particles and the first material powder are mixed, then this mixture is dried at 70° C., is then calcined at 350° C. for 1 hour and is calcined at 850° C. for 1 hour. Further, shaping is performed by powder compacting at a pressure of 70 MPa to form a shape of a cutting tool described later, and then shaping is performed by a cold isostatic press (CIP) method at a pressure of 1000 MPa. Then, the sintered material of sample 37 is obtained by performing sintering under the same sintering conditions as those in the second step for sample 31. Therefore, the sintered material of sample 37 has not been through the step of coating the cBN particles with the first material, with the result that it is difficult to satisfy $[(Dii-Di)/Dii] \times 100 \leq 50$.

<<Evaluations on Sample 31 to Sample 37>>

<Content of Each Component>

The respective contents of the cBN particles (first phase), the first material (second phase), and the binder (third phase) in each of the sintered materials of sample 31 to sample 37 are determined by the same method as in Example 1. Results thereof are as shown in Table 3, and it can be confirmed that these contents coincide with the source materials. In Table 3, the "content of the first material (second phase)" is shown as "Coating ATZ Amount". It should be noted that when each of the first material (second phase) and the binder (third phase) is ATZ, the numerical values of ATZ in the "Coating ATZ Amount" and "Binder Amount" in the Table are estimated values assuming that the respective contents coincide with those of the corresponding source materials.

<cBN Contact Ratio>

The cBN contact ratio in each of the sintered materials of sample 31 to sample 37 is calculated by the same method as that in Example 1. Results thereof are also shown in Table 3.

<Contact Ratio of First Phase and Second Phase>

The contact ratio of the first phase and the second phase in each of the sintered materials of sample 31 to sample 37 is calculated by the same method as that in Example 1. Results thereof are also shown in Table 3.

<Strength (Bending Strength σ)>

The three-point bending strength value (based on GPa as a unit) in each of the sintered materials of sample 31 to sample 37 is determined by the same method as that in Example 1. Results thereof are also shown in Table 3.

<Cutting Test>

Further, using each of the sintered materials of sample 31 to sample 37, a cutting tool having a shape of CNGA120408, a negative land angle of 15° and a negative land width of 0.12 mm is produced, and a high-speed cutting test is conducted under the following cutting conditions.

(Cutting Conditions)

Cutting speed: 500 m/min

Feed: 0.3 mm

Depth of cut: 0.15 mm

Wet type/dry type: wet type (coolant: emulsion)

Device: $L_B4000$ (provided by Okuma Corporation; a holder of EWN68-150CKB6 is used)

Workpiece: gray cast iron FC300

Shape of workpiece: cylindrical shape (outer diameter of 90 mm).

(Details of Test)

A cutting distance (km) for cutting by each of the cutting tools of sample 31 to sample 37 until occurrence of a breakage having a size of more than or equal to 200 μm is measured. It can be evaluated that as this cutting distance is longer, the cutting tool has a longer life. Results thereof are shown in Table 3.

% of the first phase is included in the sintered material, and the following relational expression (II') is satisfied:

$$[(Dii-Di)/Dii] \times 100 \leq 3 \tag{II'}$$

TABLE 3

| Sample Name | cBN Content (vol %) | Coating ATZ Amount (vol %) | Binder Amount (vol %) | | | | | cBN Contact Ratio (%) | Contact Ratio of First Phase and Second Phase (%) | Sintering Conditions | | Strength (GPa) | Life (km) |
|---|---|---|---|---|---|---|---|---|---|---|---|---|---|
| | | | ATZ | Al$_2$O$_3$ | TiN | TiC | AlON | | | Pressure (GPa) | Temperature (° C.) | | |
| Sample 31 | 85 | 15 | — | — | — | — | — | 40 | 60 | 7 | 1500 | 1.8 | 49 |
| Sample 32 | 85 | 10 | 5 | — | — | — | — | 40 | 57 | 7 | 1500 | 1.79 | 48 |
| Sample 33 | 85 | 10 | — | 5 | — | — | — | 40 | 57 | 7 | 1500 | 1.82 | 50 |
| Sample 34 | 85 | 10 | — | — | 5 | — | — | 40 | 57 | 7 | 1500 | 1.78 | 47 |
| Sample 35 | 85 | 10 | — | — | — | 5 | — | 40 | 57 | 7 | 1500 | 1.75 | 45 |
| Sample 36 | 85 | 10 | — | — | — | — | 5 | 40 | 57 | 7 | 1500 | 1.78 | 48 |
| Sample 37 | 85 | — | 15 | — | — | — | — | 70 | — | 7 | 1500 | 1.6 | 40 |

(Analysis)

As shown in Table 3, in each of the cutting tools employing sample 31 to sample 36 produced by the method of producing the sintered material according to the present disclosure, the second phase is in contact with at least a portion of the surface of the first phase, and the relational expression, $[(Dii-Di)/Dii] \times 100 \leq 50$, is satisfied. Accordingly, it is understood that the strength and life are improved as compared with those of the cutting tool employing the sintered material of sample 37.

Heretofore, the embodiments and examples of the present invention have been illustrated, but it has been initially expected to appropriately combine configurations of the embodiments and examples.

The embodiments and examples disclosed herein are illustrative and non-restrictive in any respect. The scope of the present invention is defined by the terms of the claims, rather than the embodiments and examples described above, and is intended to include any modifications within the scope and meaning equivalent to the terms of the claims.

The invention claimed is:

1. A sintered material comprising a first phase and a second phase, wherein
the first phase is composed of cubic boron nitride particles,
the second phase is composed of a first material that is partially stabilized ZrO$_2$ in which Al$_2$O$_3$ is dispersed in both or one of a crystal grain boundary and a crystal grain,
the second phase is in contact with at least a portion of a surface of the first phase, and
the following relational expressions (I) and (II) are satisfied when more than or equal to two cubic boron nitride particles adjacent to and in direct contact with each other among the cubic boron nitride particles are defined as a contact body, Di represents a length of an entire perimeter of the contact body, n represents the number of contact locations at which the cubic boron nitride particles are in direct contact with each other, d$_k$ represents a length of each of the contact locations, and Σd$_k$ represents a total length of the contact locations, where k=1 to n:

$$Dii = Di + (2 \times \Sigma^n_k = d_k) \tag{I}$$

$$[(Dii-Di)/Dii] \times 100 \leq 50 \tag{II}$$

2. The sintered material according to claim 1, wherein more than or equal to 30 volume % and less than 50 volume % of the first phase is included in the sintered material, and the following relational expression (II') is satisfied:

$$[(Dii-Di)/Dii] \times 100 \leq 3 \tag{II'}$$

3. The sintered material according to claim 1, wherein more than or equal to 50 volume % and less than 76 volume % of the first phase is included in the sintered material, and the following relational expression (II") is satisfied:

$$[(Dii-Di)/Dii] \times 100 \leq 20 \tag{II"}$$

4. The sintered material according to claim 1, wherein more than or equal to 76 volume % and less than 100 volume % of the first phase is included in the sintered material.

5. The sintered material according to claim 1, further comprising a third phase, wherein
the third phase is composed of at least one compound composed of at least one element selected from a group consisting of a group 4 element, a group 5 element, a group 6 element in a periodic table, Al and Si, and at least one element selected from a group consisting of carbon, nitrogen, and oxygen.

6. A method of producing a sintered material including a first phase composed of cubic boron nitride particles and a second phase composed of a first material, the method comprising:
a first step of obtaining a sintering precursor by coating the cubic boron nitride particles with the first material; and
a second step of obtaining the sintered material by sintering the sintering precursor at a pressure of more than 1 GPa and less than or equal to 20 GPa, wherein
the first material is partially stabilized ZrO$_2$ in which Al$_2$O$_3$ is dispersed in both or one of a crystal grain boundary and a crystal grain.

7. The method of producing the sintered material according to claim 6, wherein
the first step includes a first pre-step of obtaining a particulate mixture including the cubic boron nitride particles and a binder,
in the first step, the sintering precursor is obtained by coating, with the first material, the mixture obtained in the first pre-step instead of the cubic boron nitride particles,
the sintered material further includes a third phase composed of the binder,
the binder is composed of at least one compound composed of at least one element selected from a group consisting of a group 4 element, a group 5 element, a group 6 element in a periodic table, Al and Si, and at least one element selected from a group consisting of carbon, nitrogen, and oxygen.

8. The method of producing the sintered material according to claim 6, wherein
the second step includes a second pre-step of obtaining a mixture precursor by mixing the sintering precursor and a binder, and
in the second step, the sintered material is obtained by sintering, at a pressure of more than 1 GPa and less than or equal to 20 GPa, the mixture precursor obtained in the second pre-step instead of the sintering precursor.

* * * * *

UNITED STATES PATENT AND TRADEMARK OFFICE
CERTIFICATE OF CORRECTION

PATENT NO. : 11,192,826 B2
APPLICATION NO. : 16/609369
DATED : December 7, 2021
INVENTOR(S) : Akito Ishii et al.

Page 1 of 1

It is certified that error appears in the above-identified patent and that said Letters Patent is hereby corrected as shown below:

In the Claims

In Claim 1, Column 25, Line 63 please correct the equation from

" $Dii = Di + (2 \times \sum_{k}^{n} = d_k)$ (I) " to

-- $Dii = Di + (2 \times \sum_{k=1}^{n} d_k)$ (I) --.

In Claim 2, Column 25, Line 67 to Column 26, Line 1 "more than or equal to 30 volume % and less than 50 volume % of the first phase" should be -- more than or equal to 30 volume% and less than 50 volume% of the first phase --.

In Claim 3, Column 26, Lines 21-22 "more than or equal to 50 volume % and less than 76 volume % of the first phase" should be -- more than or equal to 50 volume% and less than 76 volume% of the first phase --.

In Claim 4, Column 26, Lines 28-29 "more than or equal to 76 volume % and less than 100 volume % of the first phase" should be -- more than or equal to 76 volume% and less than 100 volume% of the first phase --.

Signed and Sealed this
Nineteenth Day of July, 2022

Katherine Kelly Vidal
*Director of the United States Patent and Trademark Office*